(12) United States Patent
Lin

(10) Patent No.: US 8,807,759 B2
(45) Date of Patent: Aug. 19, 2014

(54) PROJECTION APPARATUS AND ARRAY LENS MODULE

(75) Inventor: Shiuan-Ting Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 90 days.

(21) Appl. No.: 13/430,716

(22) Filed: Mar. 27, 2012

(65) Prior Publication Data

US 2013/0003024 A1    Jan. 3, 2013

(30) Foreign Application Priority Data

Jun. 30, 2011  (CN) .......................... 2011 1 0186021

(51) Int. Cl.
| | | |
|---|---|---|
| *G03B 21/14* | (2006.01) | |
| *F21V 5/00* | (2006.01) | |
| *G03B 21/20* | (2006.01) | |
| *G02B 27/09* | (2006.01) | |

(52) U.S. Cl.
CPC .......... *G03B 21/208* (2013.01); *G02B 27/0961* (2013.01)
USPC .............. 353/38; 362/309; 362/331; 362/332

(58) Field of Classification Search
USPC ............ 353/38, 100, 101, 119; 362/326–340, 362/307–309
See application file for complete search history.

(56) References Cited

U.S. PATENT DOCUMENTS

| 6,935,753 | B2 * | 8/2005 | Takezawa et al. ............. 353/119 |
| 7,118,229 | B2 * | 10/2006 | Iechika et al. ................ 353/102 |
| 2004/0032569 | A1 | 2/2004 | Takezawa et al. |
| 2006/0114418 | A1 * | 6/2006 | Yamada et al. ................. 353/38 |

FOREIGN PATENT DOCUMENTS

| CN | 1457446 | 11/2003 |
| CN | 101533209 | 9/2009 |
| JP | 3389541 | 3/2003 |
| JP | 3448492 | 9/2003 |
| TW | 523118 | 3/2003 |
| TW | I317824 | 12/2009 |

OTHER PUBLICATIONS

"Office Action of China Counterpart Application", issued on Apr. 15, 2014, pp. 1-8.

* cited by examiner

*Primary Examiner* — William C Dowling
(74) *Attorney, Agent, or Firm* — Jianq Chyun IP Office

(57) ABSTRACT

A projection apparatus includes an optical engine base, a light source, a light valve, a projection lens, and an array lens module. The light source, the light valve, and the projection lens are installed to the optical engine base. The array lens module includes a frame body fixed to the optical engine base, a first array lens, and a second array lens. One of the first array lens and the frame body has a first positioning hole while the other one has a first positioning pillar inserted into the first positioning hole. One of the second array lens and the frame body has a second positioning hole while the other one has a second positioning pillar inserted into the second positioning hole. A light beam emitted by the light source passes through the first array lens, the second array lens, and the light valve sequentially to reach the projection lens.

14 Claims, 5 Drawing Sheets

PROJECTION APPARATUS AND ARRAY LENS MODULE

CROSS-REFERENCE TO RELATED APPLICATION

This application claims the priority benefit of China application serial no. 201110186021.3, filed on Jun. 30, 2011. The entirety of the above-mentioned patent application is hereby incorporated by reference herein and made a part of this specification.

FIELD OF THE INVENTION

The invention relates to an optical apparatus and a lens module thereof. More particularly, the invention relates to a projection apparatus and an array lens module thereof.

DESCRIPTION OF RELATED ART

A projection apparatus is a display apparatus used for generating large size images. The imaging principle of the projection apparatus is to convert an illumination light beam generated from a light source into an image light beam through a light valve, and then project the image light beam to a screen or a wall through a projection lens to form an image. With the advancement in projection technology and the decrease in the manufacturing cost, the use of projection apparatuses has gradually expanded from commercial use to household use.

In details, the projection apparatus includes an array lens, where a light beam emitted from a light source passes through the array lens to adjust the light beam shape. In order to adjust the light beam shape, the array lens requires sufficient thickness. However, thicker array lenses lead to more severe thermal expansion problem, which affects the image quality. A conventional method of solving the problem caused by thick array lenses includes the following. The light beam emitted by the light source passes through two thinner array lenses sequentially, so as to achieve a light beam shape adjustment similar to that resulted from using a single thick array lens. The two thinner array lenses may be misaligned due to the tolerance in manufacture and assembly. The slight misalignment of the array lenses then causes an obvious displacement of the projection image. Moreover, in order to assemble the array lenses to the optical engine base with precise alignment, the assembly becomes more difficult and the array lenses may be fractured on the sides during the assembly so as to result in non-uniform bright area on the edges of the projection image.

In Taiwan Patent No. 523118, a projector is disclosed, in which a misalignment between a cross beam splitter and a cross prism installed in a frame body thereof can be adjusted according to the structure of the frame body. In Taiwan Patent No. 1317824, a positioning structure for a lens and an optical engine of a projector is disclosed, and the positioning structure is capable of preventing the lens from oscillating.

SUMMARY OF THE INVENTION

The invention is directed to a projection apparatus, where an array lens module thereof has higher assembly accuracy.

The invention is directed to an array lens module having higher assembly accuracy.

Other purposes or advantages of the invention can be further illustrated from the technical features disclosed in the invention.

To achieve one, a portion, or all of the purposes aforementioned or other purposes, an embodiment of the invention provides a projection apparatus including an optical engine base, a light source, a light valve, a projection lens, and an array lens module. The light source is assembled to the optical engine base. The light valve is assembled to the optical engine base. The projection lens is assembled to the optical engine base. The array lens module includes a frame body, a first array lens, and a second array lens. The frame body is fixed to the optical engine base. One of the first array lens and the frame body has at least one first positioning hole while the other one has at least one first positioning pillar. The first positioning pillar is inserted into the first positioning hole to fix the first array lens to the frame body. One of the second array lens and the frame body has at least one second positioning hole while the other one has at least one second positioning pillar. The second positioning pillar is inserted into the second positioning hole to fix the second array lens to the frame body. A light beam emitted by the light source passes through the first array lens, the second array lens, and the light valve sequentially to reach the projection lens.

To achieve one, a portion, or all of the purposes aforementioned or other purposes, an embodiment of the invention provides an array lens module suitable for a projection apparatus. The projection apparatus includes an optical engine base, a light source, a light valve, and a projection lens. The light source, the light valve, and the projection lens are installed to the optical engine base. The array lens module includes a frame body, a first array lens, and a second array lens. The frame body is fixed to the optical engine base. One of the first array lens and the frame body has at least one first positioning hole while the other one has at least one first positioning pillar. The first positioning pillar is inserted into the first positioning hole to fix the first array lens to the frame body. One of the second array lens and the frame body has at least one second positioning hole while the other one has at least one second positioning pillar. The second positioning pillar is inserted into the second positioning hole to fix the second array lens to the frame body. A light beam emitted by the light source passes through the first array lens, the second array lens, and the light valve sequentially to reach the projection lens.

In light of the foregoing, in the embodiments of the invention, the first array lens and the second array lens are fixed to the frame body by the positioning holes and the positioning pillars matching each other, so that the first array lens and the second array lens have a more precise alignment. Furthermore, since the assembly of the first array lens and the second array lens does not require fixing the array lenses on the sides thereof, the fracture on the sides of the first array lens and the second array lens during the assembly could thus be avoided. Accordingly, the assembly accuracy of the array lens module could be enhanced effectively so as to ensure the superior image quality of the projection apparatus.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
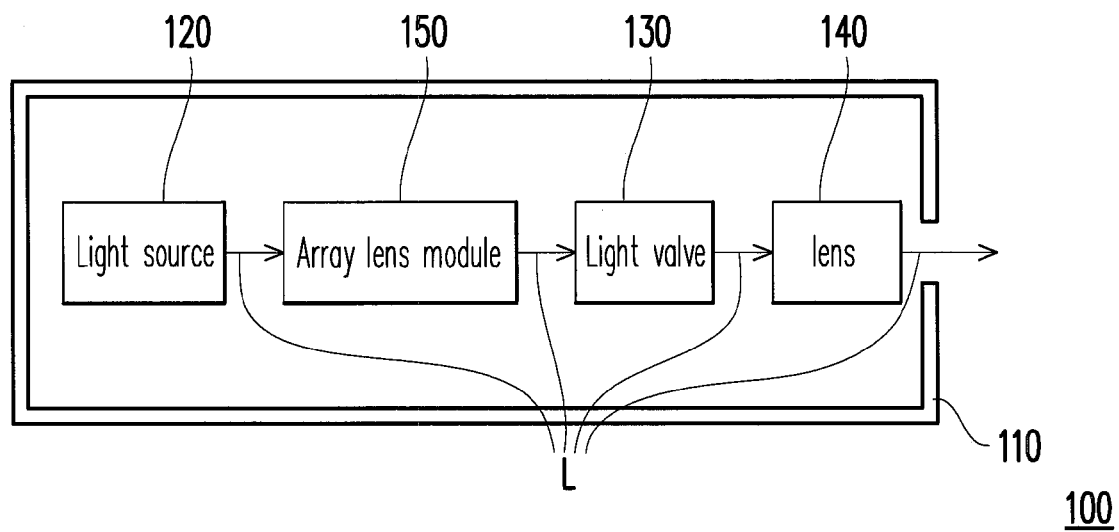
FIG. 1 is a schematic diagram illustrating a projection apparatus according to an embodiment of the invention.

FIG. 1 is a schematic diagram illustrating a projection apparatus according to an embodiment of the invention. Referring to FIG. 1, a projection apparatus 100 of the embodiment includes an optical engine base 110, a light source 120, a light valve 130, a projection lens 140, and an array lens module 150. The light source 120, the light valve 130, the projection lens 140, and the array lens module 150 are installed to the optical engine base 110. The light source 120 emits a light beam L which passes through the array lens module 150, the light valve 130, and the projection lens 140 sequentially for projecting an image.

Figure 2:
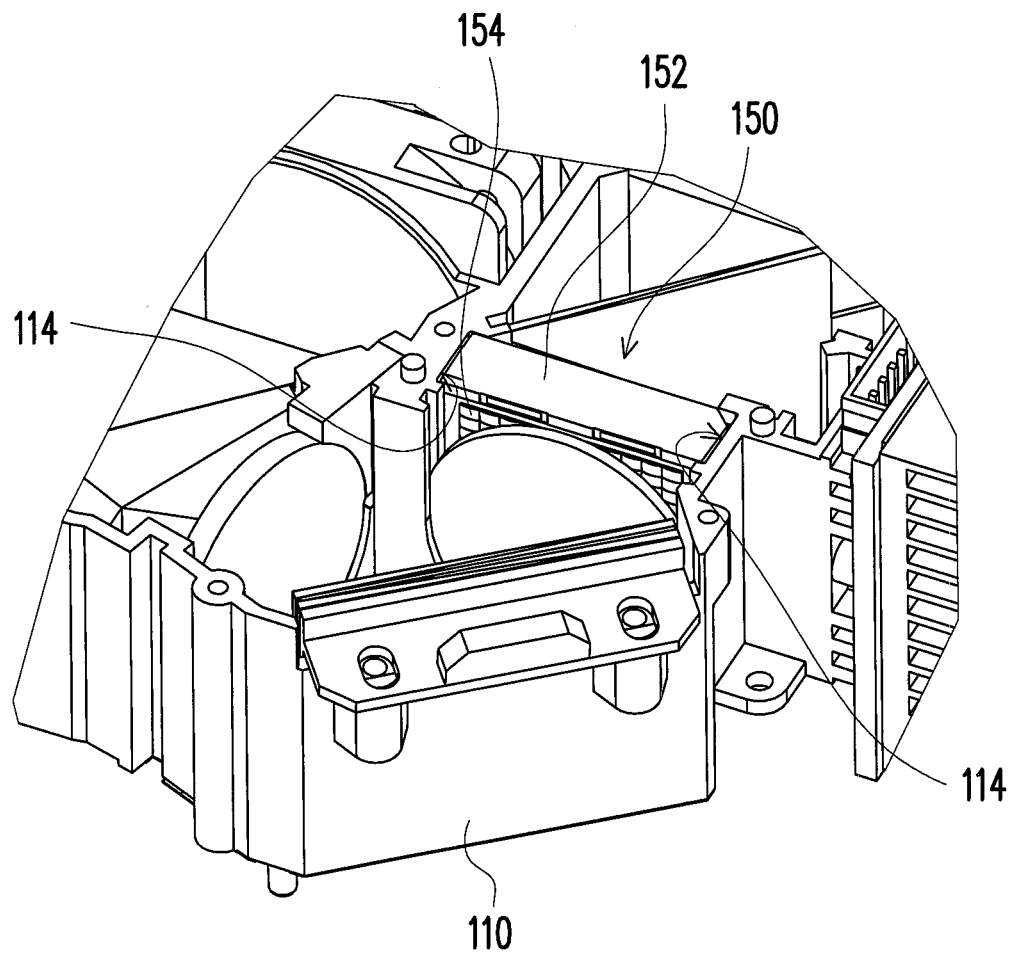
FIG. 2 is a partial three-dimensional (3D) diagram of the projection apparatus in FIG. 1.
Figure 3:
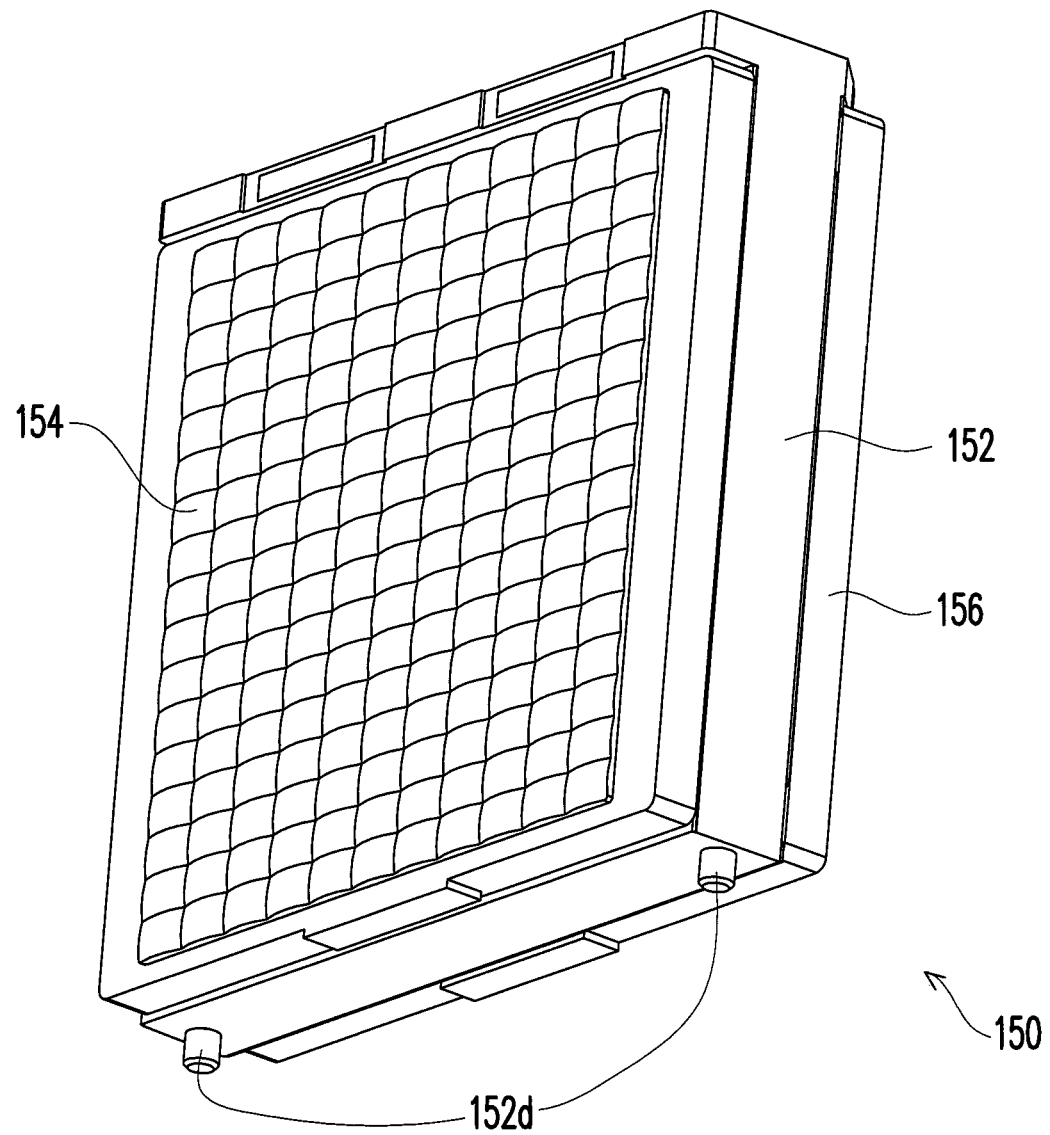
FIG. 3 is a 3D diagram illustrating an array lens module in FIG. 2.
Figure 4:
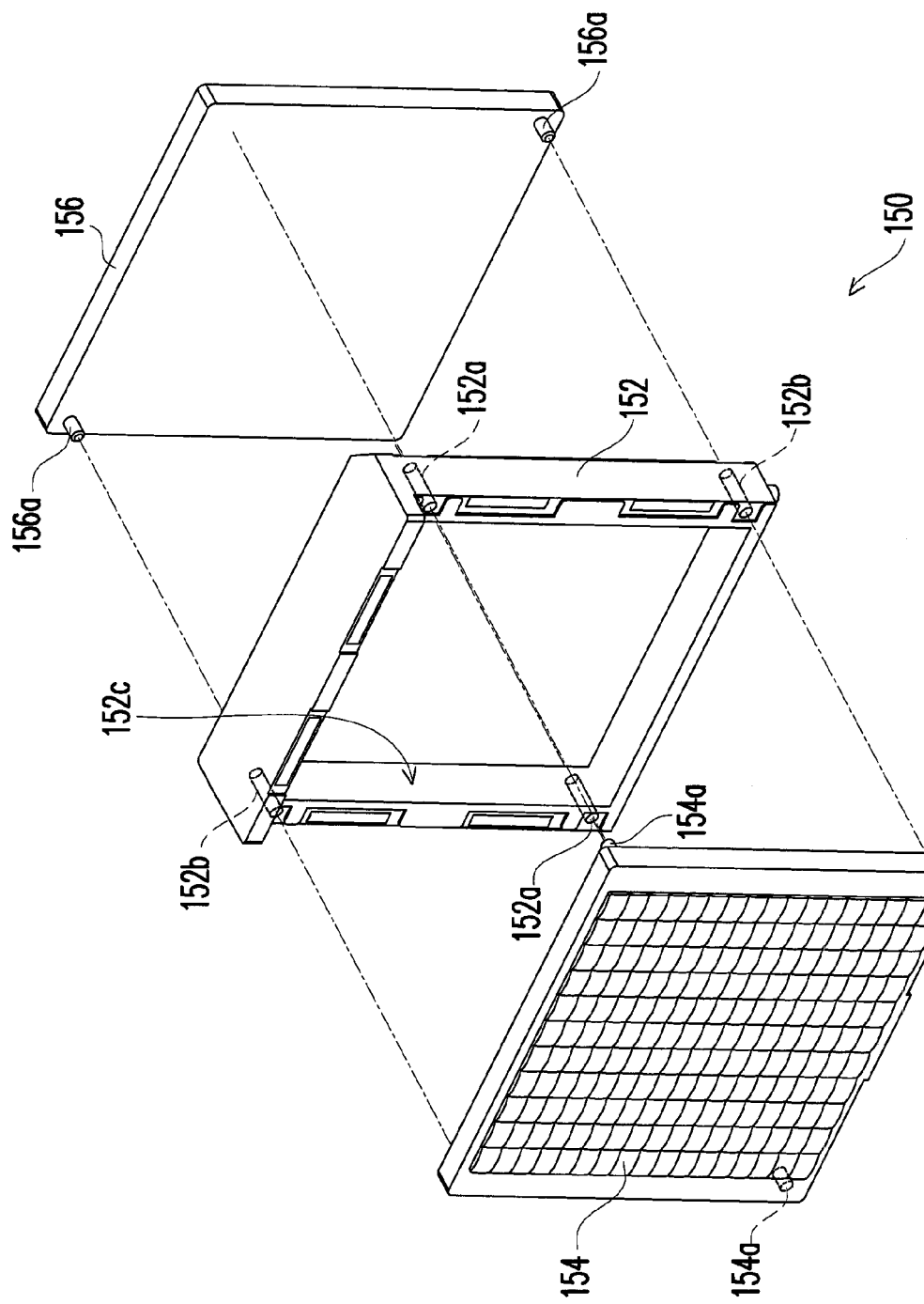
FIG. 4 is an explosion diagram illustrating the array lens module in FIG. 3.

FIG. 2 is a partial three-dimensional (3D) diagram of the projection apparatus in FIG. 1. FIG. 3 is a 3D diagram illustrating an array lens module in FIG. 2. FIG. 4 is an explosion diagram illustrating the array lens module in FIG. 3. Referring to FIGS. 2 to 4, the array lens module 150 of the embodiment includes a frame body 152, a first array lens 154, and a second array lens 156. The frame body 152 is fixed to the optical engine base 110, and has at least one first positioning hole 152a (two holes are illustrated) and at least one second positioning hole 152b (two holes are illustrated. The first array lens 154 has at least one first positioning pillar 154a (two pillars are illustrated). The first positioning pillars 154a of the first array lens 154 are inserted into the first positioning holes 152a of the frame body 152 respectively to fix the first array lens 154 to the frame body 152. The second array lens 156 has at least one second positioning pillar 156a (two pillars are illustrated). The second positioning pillars 156a of the second array lens 156 are inserted into the second positioning holes 152b of the frame body 152 respectively to fix the second array lens 156 to the frame body 152. The light beam L emitted by the light source 120 shown in FIG. 1 passes through the first array lens 154 and the second array lens 156 in sequence to adjust a light shape. Thereafter, the light beam L passes through the light valve 130 to reach the projection lens 140.

With the above disposition, the first array lens 154 and the second array lens 156 are fixed to the frame body 152 by the positioning holes and the positioning pillars matching each other, so that the first array lens 154 and the second array lens 156 have a more precise alignment. Furthermore, since the assembly of the first array lens 154 and the second array lens 156 does not require fixing the array lenses on the sides thereof, the fracture on the sides of the first array lens 154 and the second array lens 156 during the assembly could thus be avoided. Accordingly, the assembly accuracy of the array lens module 150 could be enhanced effectively so as to ensure the superior image quality of the projection apparatus 100.

In other embodiments, the first positioning pillars 154a and the second positioning pillars 156a are formed in the frame body 152. The first positioning holes 152a and the second positioning holes 152b are respectively formed in the first array lens 154 and the second array lens 156. The invention does not limit the arrangement of the positioning pillars and the positioning holes. In addition, the invention does not limit the number of the first positioning holes 152a, the second positioning holes 152b, the first positioning pillars 154a, and the second positioning pillars 156a. That is, suitable numbers of the holes and the pillars could be present in the projection apparatus.

Referring to FIGS. 3 and 4, the first array lens 154 and the second array lens 156 of the embodiment are located at respective sides of the frame body 152. Moreover, the first array lens 154 and the second array lens 156 have a suitable space therebetween, so that the array lens module 150 and a thicker single array lens have similar light shape adjustment effects. The frame body 152 has an opening 152c, the light beam L illustrated in FIG. 1 passes through the opening 152c to reach the second array lens 156 from the first array lens 154.

Figure 5:
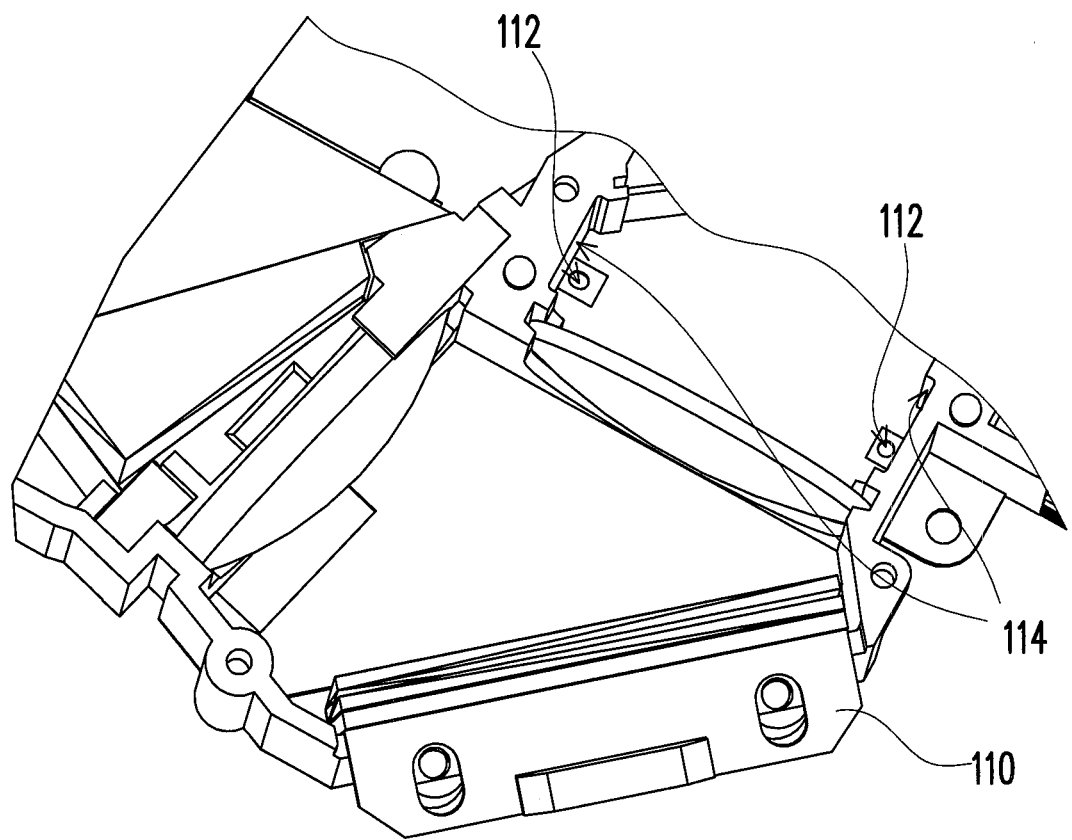
FIG. 5 is a partial 3D diagram of an optical engine base in FIG. 2.

FIG. 5 is a partial 3D diagram of an optical engine base in FIG. 2. Referring to FIGS. 3 and 5, the optical engine base 110 of the embodiment has at least one third positioning hole 112 (two holes are illustrated). The frame body 152 has at least one third positioning pillar 152d (two pillars are illustrated). The third positioning pillars 152d of the frame body 152 are inserted into the third positioning holes 112 of the optical engine base 110 respectively for fixing the frame body 152 to the optical engine base 110 as depicted in FIG. 2. The invention does not limit the number of the third positioning pillars 152d and the third positioning holes 112. That is, suitable numbers of the pillars and the holes could be present in the projection apparatus. Moreover, referring to FIGS. 2 and 5, the optical engine base 110 of the embodiment has two limit grooves 114. The two respective sides of the frame body 152 are wedged or slid into the two limit grooves 114 respectively to further fix the frame body 152.

In summary, in the embodiments of the invention, the first array lens and the second array lens are fixed to the frame body by the positioning holes and the positioning pillars matching each other, so that the first array lens and the second array lens have a more precise alignment. Furthermore, since the assembly of the first array lens and the second array lens does not require fixing the array lenses on the sides thereof, the fracture on the sides of first array lens and the second array lens during the assembly could thus be avoided. Accordingly, the assembly accuracy of the array lens module could be enhanced effectively so as to ensure the superior projection quality of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first positioning pillar", "second positioning pillar", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an optical engine base;
   a light source, assembled to the optical engine base;
   a light valve, assembled to the optical engine base;
   a projection lens, assembled to the optical engine base; and
   an array lens module, comprising:
      a frame body, fixed to the optical engine base, having at least one first positioning hole and at least one second positioning hole;
      a first array lens, having at least one first positioning pillar, the first positioning pillar being inserted into the first positioning hole of the frame body to fix the first array lens to the frame body; and
      a second array lens, having at least one second positioning pillar, the second positioning pillar being inserted into the second positioning hole of the frame body to fix the second array lens to the frame body, wherein a light beam emitted by the light source passes through the first array lens, the second array lens, and the light valve sequentially to reach the projection lens.

2. The projection apparatus as claimed in claim 1, wherein the first array lens and the second array lens are located at respective sides of the frame body, the frame body has an opening and the light beam reaches the second array lens from the first array lens via the opening.

3. The projection apparatus as claimed in claim 1, wherein the first array lens and the second array lens have a space therebetween.

4. The projection apparatus as claimed in claim 1, wherein two of each of the first positioning hole, the second positioning hole, the first positioning pillar, and the second positioning pillar are present in the projection apparatus.

5. The projection apparatus as claimed in claim 1, wherein one of the optical engine base and the frame body has at least one third positioning hole and the other one of the optical engine base and the frame body has at least one third positioning pillar, the third positioning pillar is inserted into the third positioning hole to fix the frame body to the optical engine base.

6. The projection apparatus as claimed in claim 5, wherein two of each of the third positioning hole and the third positioning pillar are present in the projection apparatus.

7. The projection apparatus as claimed in claim 1, wherein the optical engine base has two limit grooves and two respective sides of the frame body are wedged into the two limit grooves respectively.

8. An array lens module adapted to a projection apparatus, the projection apparatus comprising an optical engine base, a light source, a light valve, and a projection lens, the light source, the light valve, and the projection lens being assembled to the optical engine base, the array lens module comprises:
   a frame body, fixed to the optical engine base, having at least one first positioning hole and at least one second positioning hole;
   a first array lens, having at least one first positioning pillar, the first positioning pillar being inserted into the first positioning hole of the frame body to fix the first array lens to the frame body; and
   a second array lens, having at least one second positioning pillar, the second positioning pillar being inserted into the second positioning hole of the frame body to fix the second array lens to the frame body, wherein a light beam emitted by the light source passes through the first array lens, the second array lens, and the light valve sequentially to reach the projection lens.

9. The array lens module as claimed in claim 8, wherein the first array lens and the second array lens are located at respective sides of the frame body, the frame body has an opening and the light beam reaches the second array lens from the first array lens via the opening.

10. The array lens module as claimed in claim 8, wherein the first array lens and the second array lens have a space therebetween.

11. The array lens module as claimed in claim 8, wherein two of each of the first positioning hole, the second positioning hole, the first positioning pillar, and the second positioning pillar are present in the array lens module.

12. The array lens module as claimed in claim 8, wherein one of the optical engine base and the frame body has at least one third positioning hole and the other one of the optical engine base and the frame body has at least one third positioning pillar, the third positioning pillar is inserted into the third positioning hole to fix the frame body to the optical engine base.

13. The array lens module as claimed in claim 12, wherein two of each of the third positioning hole and the third positioning pillar are present in the array lens module.

14. The array lens module as claimed in claim 8, wherein the optical engine base has two limit grooves and two respective sides of the frame body are wedged into the two limit grooves respectively.

\* \* \* \* \*